INVENTORS
JAMES H. GODFREY
MILFORD D. BURROWS
ORESTES M. DAVEY
BY Lindsey, Prutzman and Hayes
ATTORNEYS Sept. 21, 1965   J. H. GODFREY ETAL   3,207,193
ROTARY CUTTING TOOL
Filed Jan. 4, 1963   2 Sheets-Sheet 2
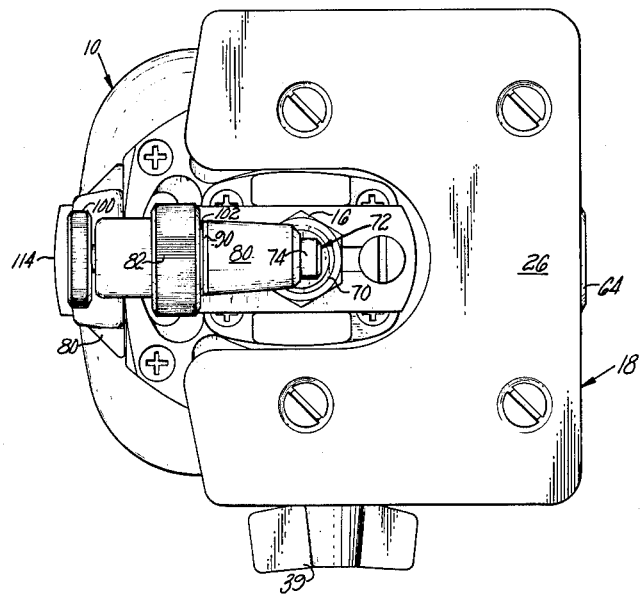
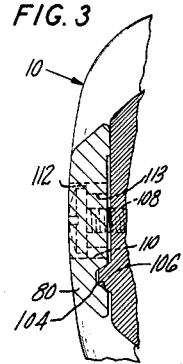
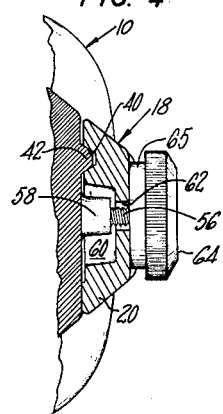
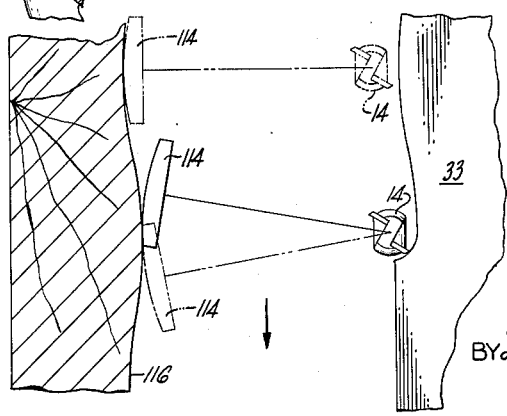
INVENTORS
JAMES H. GODFREY
MILFORD D. BURROWS
ORESTES M. DAVEY
BY Lindsey, Prutzman and Hayes
ATTORNEYS

United States Patent Office 3,207,193
Patented Sept. 21, 1965

3,207,193
ROTARY CUTTING TOOL
James H. Godfrey, Berlin, Milford D. Burrows, Avon, and Orestes M. Davey, New Britain, Conn., assignors to The Stanley Works, New Britain, Conn., a corporation of Connecticut
Filed Jan. 4, 1963, Ser. No. 249,508
6 Claims. (Cl. 144—144)

This invention relates to rotary cutting tools of the type capable of finishing an edge of a workpiece and usually constructed for portable use with a depending driven bit guided for controlling the cutting of the workpiece.

A principal aim of this invention is to provide a new and improved rotary cutting tool operable for controlling the cutting of a workpiece as for trimming the edge of a veneered counter top in accordance with the contour of a surface to which the workpiece is to abut thereby ensuring a perfect fit even with an irregular abutting surface.

Another aim of this invention is to provide a rotary cutting tool of the type described which can be precisely and conveniently adjusted for accurate flush or bevel trimming of acute, obtuse or right angle edges and for controlling the depth of cut of the cutting bit along the axis of the bit or laterally thereof.

A further aim of the present invention is to provide a rotary cutting tool that is adaptable either as a trimmer for trimming the edge of a workpiece or as a conventional router and which has a sturdy and compact construction which allows it to be conveniently manipulated by an operator in restricted and out-of-the-way locations.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 2 is a bottom plan view of the rotary cutting tool of FIG. 1;

FIG. 3 is a partial sectional view taken along line 3—3 of FIG. 1;

FIG. 4 is a partial sectional view taken along line 4—4 of FIG. 1;

FIG. 5 is a plan view of an adjustment locking lever of the rotary cutting tool;

FIG. 6 is a bottom plan view partly broken away of the installation of FIG. 1 showing portions of the tool with solid and broken lines in angularly and linearly related positions.

Figure 1:
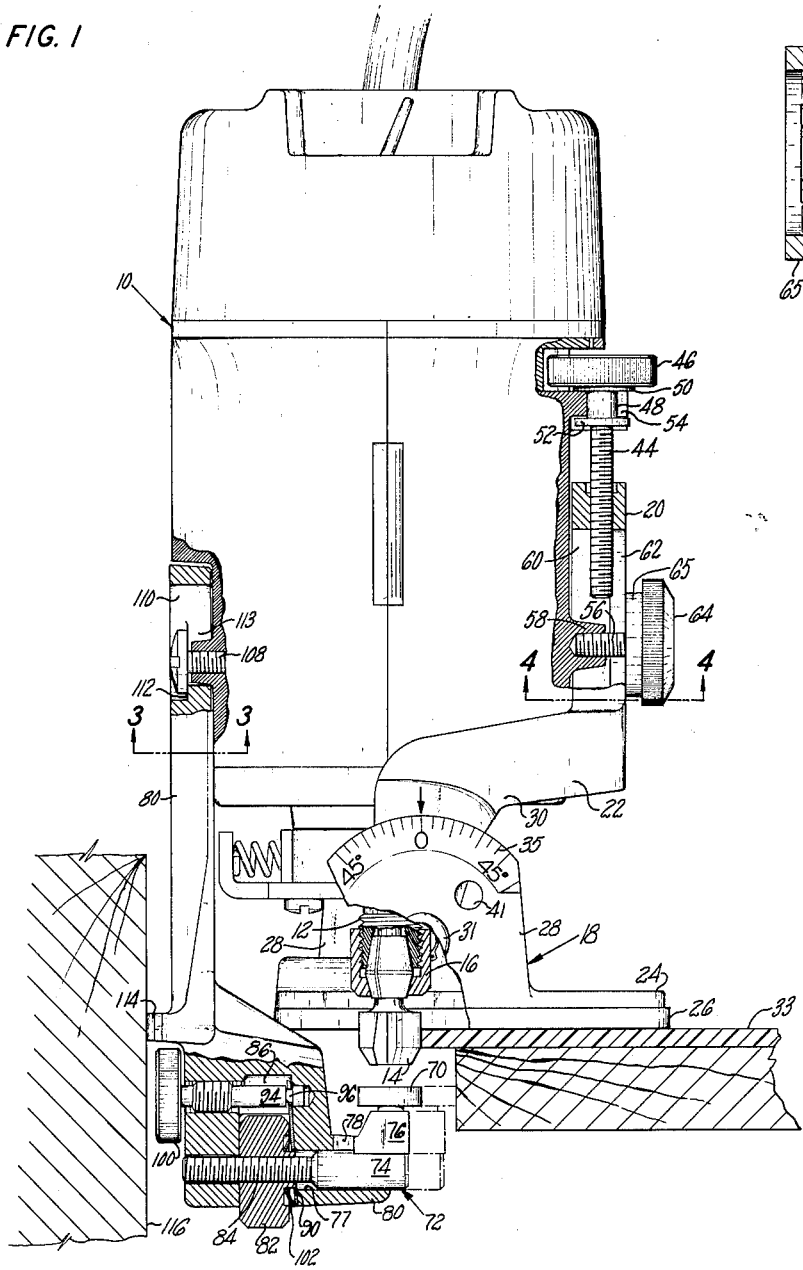
FIG. 1 is a side elevation view, partly broken away and partly in section of a rotary cutting tool of the present invention shown installed for cutting an edge of a workpiece in accordance with the contour of a wall surface against which it is to abut.
Figure 7:
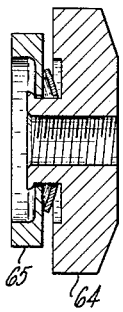
FIG. 7 is an enlarged section view of a knob subassembly of the rotary cutting tool.

Referring now to the drawings in detail, an embodiment of the rotary cutting tool of this invention includes an elongated housing, generally denoted by the numeral 10, enclosing a conventional rotary electric motor having a depending threaded drive shaft 12 with a tapered opening in the end thereof for mounting a cutting bit 14 thereon by a threaded coupling 16. Guiding the housing is a guide or base bracket subassembly, generally denoted by the numeral 18, having an elongated mounting portion 20, a yoke portion 22 and a base portion 24 surfaced with a hard and smooth material 26 that will slide freely along the surface of a workpiece 33 without marring the surface thereof. The base portion 24 has a pair of upstanding projections 28 on opposite sides of the drive shaft 12 mounted on arms 30 of the yoke by pivot pins 31 for pivotal movement about a laterally extending axis. The base 24 may therefore be positioned to guide the housing at right angles to the workpiece 33, shown to be of laminated construction in FIG. 1, or for trimming the edge of the workpiece at an acute or obtuse angle. The cutting angle may be accurately established by reference to a pointer on the yoke arm 30 and a scale 35 on the base portion 24 and rigidly maintained in a selected position by a winged locking screw 39 received within an arcuate slot in the base projection opposite the scale and threaded within the corresponding yoke arm. A similar arcuate slot could be provided in the base projection 28 having the scale 35 to provide for repositioning the winged locking screw when it is desirable to reach into a corner with the cutting tool on the side which normally carries the locking screw, or a single opening 41 could be provided in the base projection for locking the base at a fixed angle, here shown to be 45°.

For mounting the housing bracket subassembly 18 for longitudinal movement parallel to the axis of the shaft 12, the mounting portion 20 is provided with an elongated inwardly tapered slot 40 receiving a complementary tapered elongated track 42 of the housing. The base bracket subassembly is adjustably positioned by an adjustment screw 44 threaded within the mounting portion 20 and having an enlarged head 46 knurled for convenient manual adjustment. The longitudinal adjustment screw 44 has a journal 48 between integral shoulders 50 and 52 that is received within a laterally extending slot 54 in the housing for preventing longitudinal movement of the adjustment screw but allowing convenient lateral disassembly of the bracket subassembly. The bracket subassembly is secured to the housing by a knurled knob 64 threaded on a laterally extending locking stud 56 fixed to a housing projection 58, and the projection 58 and stud 56 are received within elongated slots 60 and 62 in the mounting portion 20 to allow for longitudinal adjustment of the bracket. Assembled with the knob 64 is a movable spring biased washer 65 that transmits its spring load against the bracket to preclude backlash movement of the bracket when the knob is partially unscrewed for adjusting the bracket. When the knob is tightened it engages the washer 65 to fully lock the bracket and to avoid compressing the spring below a minimum axial dimension.

Lateral control of the cutting bit 14 may be obtained in the conventional manner by a cylindrical depth guide 70 located in juxtaposition with the bit for adjustment into contact with the edge of the workpiece as shown by phantom lines in FIG. 1. Preferably, the depth guide 70 is rotatively mounted on a guide block 72 about an axis extending parallel to the axis of the drive shaft. The guide block 72 has a cylindrical portion 74 and an upstanding portion 76 received within corresponding cylindrical openings and slots 77 and 78, respectively, in a guide supporting bracket 80 to allow lateral movement of the guide block 72 radially of the axis of the drive shaft and normal to the axis of pivotal movement of the base portion 24 on the yoke arms 30. An adjustment nut 82 screwed on a reduced threaded portion 84 of the guide block and received within a slot 86 in the supporting bracket 80 provides a manual control for lateral adjustment of the guide roller 70 while preventing inadvertent lateral movement of the guide roller.

The adjusting nut 82 is locked against rotational and lateral movement by a locking lever 90, best shown in FIG. 5, having an opening 92 receiving the threaded shank of the guide block, and extending within the slot 86 of the guide bracket. A locking screw 94 threaded within the guide bracket and extending within the slot 86 has a reduced portion 96 defining an annulus receiving the bifurcated end 98 of the locking lever. Consequently, by manually adjusting the enlarged knurled head 100 of the locking screw the locking lever 90 can be caused to pivot into engagement with the bracket 80 and an axial surface of the adjusting nut 82 to frictionally lock the adjusting nut against rotation and to hold it from lateral movement within the slot 86. For preventing backlash movement of the depth guide 70 during the adjustment thereof, there is provided a spring washer 102 received within an annulus in an axial face of the adjusting nut and bearing against the locking lever.

For maintaining the proper alignment of the bracket 80 on the motor housing there is provided on the bracket 80 an elongated inwardly tapering slot 104 and a complementary track or projection 106 on the housing 10. The bracket is readily removed and installed on the housing by threading a laterally extending screw 108 within the housing. The screw 108 has an enlarged head receivable within an enlarged opening 110 of a keyhole type slot in the bracket and can be tightened against a shoulder 112 defining the lower narrow opening 113 of the keyhole slot to fix the bracket to the housing. The bracket assembly can therefore be removed by merely loosening the locking screw 108 and by moving the bracket 80 downwardly and outwardly.

As a major provision of the present invention a wear insert 114 is fixed to the lower portion of the guide bracket 80 above and laterally outwardly of the knurled head 100 of the locking screw and substantially in the lateral plane of the cutting bit 14. The wear insert 114 is preferably made of a hardened steel and bonded to the bracket 80. As best shown in FIGS. 2 and 6 the insert is of arcuate shape having an outer profile in a laterally extending plane of a portion of a circle having its center on the axis of the drive shaft 12 thereby providing a contour cutting guide engageable as with a wall 116 (FIG. 1) to which the laminated workpiece 33 is to abut. Consequently, as shown in FIG. 6, with an irregular wall surface, the cutting bit is guided along the wall to trim an edge on the laminated workpiece 33 complementary to the surface of the wall to thereby ensure proper abutting engagement of the workpiece and the wall. Inasmuch as the insert 114 has an outer circular profile, angular movement of the cutter during linear movement thereof along the workpiece will not affect the proper contour cutting of the workpiece edge. This is demonstrated in the lower portion of FIG. 6 wherein the wear insert is shown with solid and broken lines in two positions angularly related to the tool bit axis with different parts of the wear insert being in contact with the same point on the wall surface thereby assuring proper cutting of the workpiece notwithstanding rotary displacement of the cutting tool. As an alternative to the bracket 80, a supplementary bracket having a contour cutting guide 114 and excluding the depth guide mechanism could be mounted on the housing where space below the edge to be trimmed is limited.

Accordingly, it can be seen that the rotary cutting tool of the present invention is capable of being conveniently and accurately adjusted for selecting the axial and lateral cutting depth and the angularity of the cut with respect to the surface of the workpiece. Additionally, the rotary cutting tool of the present invention provides a readily usable guide for controlling the cutting bit to provide a contour on the workpiece complementary to the surface against which it will abut. Further, the rotary cutting tool of the present invention provides a highly compact and flexible cutting tool which may be readily used as either a trimmer or as a conventional router and which is compactly constructed for easy manipulation at varying angles of operation in out-of-the-way and restricted locations.

As will be apparent to persons skilled in the art, various modifications and adaptations of the structure above described will become readily apparent without departure from the spirit and scope of the invention, the scope of which is defined in the appended claims.

We claim:
1. A rotary cutting tool comprising a housing, a drive shaft rotatably mounted within the housing adapted for mounting a cutting bit thereon, means within the housing for driving the drive shaft, a guide bracket on the housing, a guide block slidably mounted on the guide bracket for movement in a direction laterally of the axis of the drive shaft, a cutting guide on the guide block movable with the guide block into juxtaposition with the cutting bit for controlling the lateral cut thereby, an adjustment nut having threaded engagement with the guide block and the bracket having a slot receiving the adjustment nut for preventing substantial lateral movement thereof, a locking screw threaded in the bracket and extending into the bracket slot, and a locking lever within the bracket slot engageable for actuation by the locking screw and positioned in part laterally between the adjustment nut and bracket, said locking lever upon actuation thereof by the locking screw wedging the adjustment nut to prevent rotational and lateral movement thereof.

2. A portable rotary cutting tool comprising a housing, a drive shaft rotatably supported within the housing and adapted for mounting a cutting bit thereon, means within the housing for rotatably driving the drive shaft, housing guide means including a yoke portion having arms extending laterally on opposite sides of the drive shaft, a base portion mounted on the yoke arms for pivotal movement about a laterally extending axis and a mounting portion, means providing longitudinal adjustment of the mounting portion on the housing in a direction parallel to the axis of the drive shaft, and a guide subassembly including a guide bracket supported on the housing, a guide block slidably mounted on the guide bracket for lateral movement normal to the axis of pivotal movement of the base portion, an adjustment nut having threaded engagement with the guide block and the bracket having a slot receiving the adjustment nut for preventing substantial lateral movement thereof, a locking screw threaded in the bracket and extending into the bracket slot, and a locking lever within the bracket slot engageable for actuation by the locking screw and positioned in part laterally between the adjustment nut and bracket, said locking lever upon actuation thereof by the locking screw laterally wedging the adjustment nut to prevent rotational and lateral movement thereof.

3. A rotary cutting tool comprising a housing, a drive motor mounted within the housing having a drive shaft adapted for mounting a cutting bit thereon, a housing base bracket including a yoke portion having arms extending laterally on opposite sides of the drive shaft, a base portion mounted on the yoke arms for pivotal movement about an axis extending laterally of the axis of the drive shaft and a mounting portion, said base portion being generally U-shaped with legs extending on opposite sides of the drive shaft, an adjustment screw rotatably mounted on the housing and having threaded engagement with the mounting portion for longitudinally adjusting the support in a direction parallel to the axis of the drive shaft, the housing and mounting portion having longitudinally extending interfitting portions guiding the base bracket on the housing, means for securing the mounting portion to the housing, and a guide subassembly including a guide bracket removably mounted on the housing, a threaded guide block slidably mounted on the guide bracket for lateral movement normal to the axis of pivotal movement of the base portion, said guide bracket being slotted and said guide block having a threaded portion extending within said slot, a depth adjustment nut threaded on the threaded portion of the guide block and received within the bracket slot for preventing substantial lateral movement thereof, a locking screw having threaded engagement with the guide bracket and extending within the bracket slot, a locking lever within the bracket slot engageable for actuation by the locking screw and positioned in part between the adjustment nut and bracket, said locking lever upon actuation thereof by the locking screw wedging the adjustment nut to prevent rotational and lateral movement thereof, a depth guide roller mounted on the guide block for rotational movement upon an axis extending parallel to the shaft axis, the depth guide roller being laterally movable with the guide block into coaxial relationship with the shaft, and a contour guide spaced laterally from the axis of the drive shaft having an outer profile in a lateral plane of a portion of a circle having its center on the axis of the drive shaft whereby the contour guide provides a lateral control of the cutting bit for cutting an edge of a workpiece complementary to a surface against which the workpiece is to abut.

4. In a rotary cutting tool of the type having a rotatable cutting bit, a base engageable with a surface of a workpiece for guiding the cutting bit along an edge thereof, a cutting guide in juxtaposition with the cutting bit, a cutting guide support block, a bracket for mounting the support block for slideable movement laterally of the axis of rotation of the cutting bit for adjusting the lateral depth of cut of the bit, and means for laterally adjusting the support block on the bracket, the improvement wherein the bracket is provided with a slot transverse of the slideable axis of the support block and wherein the adjustment means comprises an adjustment nut in the slot threaded to the support block, a generally flat locking lever within the slot having a first end interposed between one face of the adjustment nut and the bracket for wedging the opposite face of the adjustment nut against the bracket and a second end with an opening, and a locking screw threaded to the bracket having a reduced portion received in the opening of the lever for pivotal actuation of the lever.

5. In a portable cutting tool of the type having a housing, a drive shaft rotatably supported within the housing and mounting a cutting bit thereon, means within the housing including a motor for rotatably driving the drive shaft and cutting bit, and a housing guide bracket having a base portion spaced laterally of the axis of the drive shaft and engageable with a surface of a workpiece for guiding the cutting bit for trimming an edge thereof, the improvement comprising means for pivotally adjusting the base portion of the housing guide bracket about an axis extending laterally of the axis of the drive shaft, and a contour guide spaced laterally of the axis of the drive shaft mounted on the housing, said contour guide having an outer periphery with a profile in a laterally extending plane of a portion of a circle having its center on the axis of the drive shaft, said circle portion intersecting a radial of the axis of the shaft extending normal to the pivotal axis of the base portion, and means for axially adjusting the contour guide on the housing for positioning the contour guide profile in a plane intersecting the portion of the cutting bit operative for trimming the edge of the workpiece and extending normal to the axis of the cutting bit whereby the contour guide is axially adjustable for engagement with a surface against which the edge of the workpiece is to abut for guiding the cutting bit along the workpiece for trimming a complementary abutting edge thereon.

6. A portable rotary cutting tool comprising a housing, a drive shaft rotatably mounted within the housing and adapted for supporting a cutting bit thereon, means within the housing for rotatably driving the drive shaft, a housing guide bracket including a mounting portion and a base portion pivotally supported thereon for pivotal movement about a laterally extending axis, means for adjusting the mounting portion on the housing in a direction parallel to the axis of the drive shaft, a cutting guide mounted on the housing for lateral movement normal to the axis of pivotal movement of the base portion for controlling the lateral depth of cut of the cutting bit, means for laterally adjusting the cutting guide, and a contour guide mounted on the housing having an outer periphery with a circular profile in a laterally extending plane, said circular profile intersecting a radial of the axis of the shaft extending normal to the pivotal axis of the base portion, and means for axially adjusting the contour guide for positioning the contour guide profile in a plane intersecting the portion of the cutting bit operative for trimming the edge of the workpiece and extending normal to the axis of the cutting bit whereby the base portion is pivotally adjustable and the contour guide is axially adjustable for positioning the contour guide in accurate engagement with a surface against which an edge of a workpiece is to abut to provide lateral control of the cutting bit for trimming the edge of the workpiece complementary to the abutting surface.

References Cited by the Examiner
UNITED STATES PATENTS

| | | | |
|---|---|---|---|
| 2,242,514 | 5/41 | Smith | 151—20 |
| 2,630,151 | 3/53 | Turnbull | 144—136.3 |
| 2,693,207 | 11/54 | Berge | 144—136.3 |
| 2,696,857 | 12/54 | Groehn et al. | 144—144 |
| 2,717,013 | 9/55 | Zwalenburg | 144—134.5 |
| 2,734,572 | 2/56 | Pater | 151—20 |
| 2,839,107 | 6/58 | Emmons | 144—136.3 |
| 2,855,963 | 10/58 | Potter | 144—136.3 |
| 2,943,655 | 7/60 | Pedersen et al. | 144—136.3 |
| 2,990,861 | 7/61 | Macks et al. | 144—134.5 |

LESTER M. SWINGLE, *Primary Examiner.*

WILLIAM W. DYER, JR., *Examiner.*